(12) United States Patent
Kawaguchi

(10) Patent No.: US 10,545,741 B2
(45) Date of Patent: Jan. 28, 2020

(54) INFORMATION PROCESSING APPARATUS, METHOD OF COMPILING, AND STORAGE MEDIUM

(71) Applicant: FUJITSU LIMITED, Kawasaki-shi, Kanagawa (JP)

(72) Inventor: Yuki Kawaguchi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 15/156,717

(22) Filed: May 17, 2016

(65) Prior Publication Data

US 2016/0350090 A1 Dec. 1, 2016

(30) Foreign Application Priority Data

May 29, 2015 (JP) .................. 2015-110680

(51) Int. Cl.
    *G06F 9/45*     (2006.01)
    *G06F 8/41*     (2018.01)

(52) U.S. Cl.
    CPC .................. *G06F 8/4441* (2013.01)

(58) Field of Classification Search
    CPC ....................................................... G06F 9/45
    USPC ................................................. 717/140–148
    See application file for complete search history.

(56) References Cited

U.S. PATENT DOCUMENTS

| | | | |
|---|---|---|---|
| 5,812,855 A * | 9/1998 | Hiranandani | G06F 8/433 707/999.01 |
| 5,842,021 A | 11/1998 | Odani et al. | |
| 5,864,700 A | 1/1999 | Barton et al. | |
| 6,073,126 A * | 6/2000 | Endo | G06F 11/1425 706/45 |
| 6,106,571 A * | 8/2000 | Maxwell | G06F 11/3644 714/E11.209 |
| 6,182,281 B1 | 1/2001 | Nackman et al. | |
| 7,389,501 B1 * | 6/2008 | Farouki | G06F 8/441 717/152 |
| 2003/0023961 A1 * | 1/2003 | Barsness | G06F 8/443 717/152 |
| 2005/0268217 A1 * | 12/2005 | Garrison | G06F 17/243 715/234 |
| 2007/0130176 A1 * | 6/2007 | Kawabe | G06F 17/248 |

(Continued)

FOREIGN PATENT DOCUMENTS

| | | |
|---|---|---|
| JP | 6-501579 | 2/1994 |
| JP | 9-6627 | 1/1997 |

(Continued)

OTHER PUBLICATIONS

Jogojapan ("Difference between constexpr and const") Jan. 2013 (Year: 2013).*

*Primary Examiner* — Jae U Jeon
(74) *Attorney, Agent, or Firm* — Xsensus, LLP

(57) ABSTRACT

An information processing apparatus configured to compile a source program in a compiling process, the information processing apparatus includes: a memory; and a processor coupled to the memory and configured to: out of one or more variables included in a source program, identify a variable being available as a constant in the compiling process; add a specifier to the source program, the specifier declaring to handle the identified variable as the constant in the compiling process; and convert the source program to which the specifier is added into an object program.

13 Claims, 19 Drawing Sheets

(56) References Cited

U.S. PATENT DOCUMENTS

| | | | | |
|---|---|---|---|---|
| 2008/0244472 A1* | 10/2008 | Nayak | ............... | G06F 17/505 |
| | | | | 716/132 |
| 2011/0307875 A1* | 12/2011 | Xu | ............... | G06F 8/437 |
| | | | | 717/151 |
| 2012/0233601 A1* | 9/2012 | Gounares | ............... | G06F 8/443 |
| | | | | 717/143 |
| 2012/0284689 A1* | 11/2012 | Armstrong | ............... | G06F 8/30 |
| | | | | 717/113 |
| 2014/0344569 A1* | 11/2014 | Li | ............... | G06F 21/128 |
| | | | | 713/164 |
| 2014/0372995 A1* | 12/2014 | Mori | ............... | G06F 8/452 |
| | | | | 717/146 |
| 2015/0007150 A1* | 1/2015 | Anton | ............... | G06F 11/3466 |
| | | | | 717/132 |

FOREIGN PATENT DOCUMENTS

| JP | 10-40114 | 2/1998 |
|---|---|---|
| WO | WO 92/15944 | 9/1992 |

\* cited by examiner

FIG. 1

```
constexpr auto r = 10.0;
constexpr auto pi = 3.1415;
constexpr auto area = r * r * pi;
```

FIG. 2

```
int hoge(void){
  int a = 10;
  int b = 20;
  a += b;

return a;
}
```

FIG. 3

```
int hoge(void){
  constexpr int a = 10;
  constexpr int b = 20;
  a += b;

return a;
}
```

FIG. 6

```
1 int hoge(void){
2   int a = 10;
3   int b = 20;
4   a += b;
5
6   return a;
7 }
```

FIG. 8

| VARIABLE NAME | LEFT-HAND SIDE VALUE | RIGHT-HAND SIDE VALUE |
|---|---|---|
| a | (2) | – |
| b | (4) | (5,2) |
| a | (5) | (5,1),(6,0) |

FIG. 9

| TYPE | VARIABLE NAME | ATTRIBUTE |
|---|---|---|
| int | a | |
| int | b | |

FIG. 11

| TYPE | VARIABLE NAME | ATTRIBUTE |
|---|---|---|
| int | a | constexpr |
| int | b | |

FIG. 13

| TYPE | VARIABLE NAME | ATTRIBUTE |
|---|---|---|
| int | a | constexpr |
| int | b | |
| int | a2 | |

FIG. 15

| VARIABLE NAME | LEFT-HAND SIDE VALUE | RIGHT-HAND SIDE VALUE |
|---|---|---|
| a | (2) | – |
| b | (4) | (5,2) |
| a2 | (5) | (5,1),(6,0) |

FIG. 16

| TYPE | VARIABLE NAME | ATTRIBUTE |
|---|---|---|
| int | a | constexpr |
| int | b | constexpr |
| int | a2 | constexpr |

FIG. 17

```
1 int hoge(void){
2
3   constexpr int a = 10;
4   constexpr int b = 20;
5   constexpr int a2 = a + b;
6
7   return a2;
8 }
```

FIG. 18

|  | CONSTANT PROPAGATION | MANUAL ADDITION OF constexpr | PRESENT METHOD |
|---|---|---|---|
| PROCESSOR DEPENDENCE | × | ○ | ○ |
| TRANSLATION TIME | × | ○ | ○ |
| EXECUTION TIME | ○ | △ | ○ |
| CONVENIENCE | ○ | × | ○ |

INFORMATION PROCESSING APPARATUS, METHOD OF COMPILING, AND STORAGE MEDIUM

CROSS-REFERENCE TO RELATED APPLICATION

This application is based upon and claims the benefit of priority of the prior Japanese Patent Application No. 2015-110680, filed on May 29, 2015, the entire contents of which are incorporated herein by reference.

FIELD

The embodiments discussed herein are related to a compilation technique.

BACKGROUND

The compiler as a language processor compiles a source program created by a user and generates an executable application (also called an object program). By describing a source program while specifying optimization options, the user may cause the compiler to optimize the application, and thereby improve performance of the application. Particularly, in the field of high performance computing (HPC), reducing the program execution time is important, and the optimization by the compiler (called a compiler optimization) has been attracting attention.

As a compiler optimization, a technique called the constant propagation is known. The constant propagation is a technique that replaces, for example, a variable in a mathematical expression with a constant when compiling. It is common that constant calculation based on the constant propagation is executed in the middle end or the back end of the compiler. On the contrary, a very simple constant calculation is executed in the front end. Although a function of the constant calculation based on the constant propagation may be implemented in the front end, this is not preferable since the implemented function is processor-dependent and the compilation time may increase.

In 2011, the standard called C++11 was established, and a specifier called constexpr (generalized CONSTant EXPRessions) was introduced. The user may add constexpr to a variable, a function and a class in the source program and thereby cause the front end of the compiler to execute constant calculation thereof. When the constant propagation is used, the constant calculation is performed every time an optimization function is applied. Meanwhile, constexpr enables the constant calculation at one time and thereby reduces the compilation time.

As for examples of related techniques, Japanese Laid-open Patent Publication Nos. 09-006627 and 10-40114 and Japanese National Publication of International Patent Application No. 06-501579, are known.

SUMMARY

According to an aspect of the invention, an information processing apparatus configured to compile a source program in a compiling process, the information processing apparatus includes: a memory; and a processor coupled to the memory and configured to: out of one or more variables included in a source program, identify a variable being available as a constant in the compiling process; add a specifier to the source program, the specifier declaring to handle the identified variable as the constant in the compiling process; and convert the source program to which the specifier is added into an object program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1, 2, and 3 are a diagram for illustrating constexpr;
FIG. 6 illustrates an example of a source program;
FIG. 8 illustrates an example of an arrangement table;
FIG. 9 illustrates an example of a symbol table;
FIG. 11 illustrates another example of the symbol table;
FIG. 13 illustrates another example of the symbol table;
FIG. 15 illustrates another example of the arrangement table;
FIG. 16 illustrates another example of the symbol table;
FIG. 17 illustrates an example of a modified source program;
FIG. 18 is a diagram for illustrating a difference of a method according to the present embodiment from other methods.

DESCRIPTION OF EMBODIMENTS

Constexpr of C++11 has a problem in that it is difficult for a general user to create a source program by fully using constexpr since there are various limitations of the language specification thereof. This problem is not focused on by related techniques.

In one aspect of the present embodiment, it is an object of the present embodiment to provide a technique for reducing the program execution time.

Figure 2:
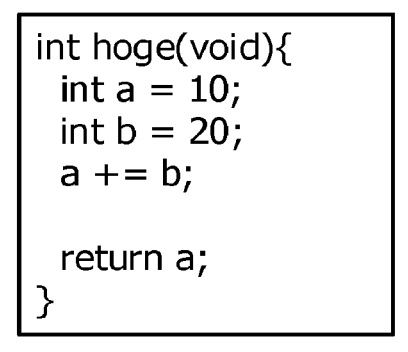

Constexpr is described below with reference to FIGS. 1, 2, and 3. FIGS. 1, 2, and 3 are diagrams for illustrating constexpr.

FIG. 1 illustrates an example of the source program described by using constexpr. The example of FIG. 1 is an example of calculating the area of a circle, where constexpr is added to variables r, pi, and area. Thus, a constant calculation may be executed in compiling. An integer of a constant for executing may be handled as a constant for compiling in a standard older than C++11 as well. However, it is not possible to handle a floating point, a function and a class as the constant for compiling due to a limitation of the standard. The constant for compiling is a constant whose value is calculated in compiling, and the constant for executing is a constant whose value is calculated in executing.

However, the problem is not solved by simply adding constexpr by the user since C++11 has various limitations of the language specification as described above. FIG. 2 illustrates an example of an error which occurs when constexpr is simply added to a source program. The example of FIG. 2 illustrates an example of returning the result when a variable a is added to a variable b. When constexpr is simply added to the source program illustrated in FIG. 2, a program as illustrated in FIG. 3 is obtained. In the program illustrated in FIG. 3, constexpr is added to the variable a and the variable b. In the program illustrated in FIG. 3, there is no problem with codes preceding the code "a+=b;". However, an error occurs in the code "a+=b;" since updating of a is not possible as it is a const (constant).

When constexpr is added to the source program by constraint, the source program may become illegible or may describe an unintended source program. Further, the standard template library (STL) or a constexpr function explicitly created by the user, if any, is not calculated in compiling unless a passed argument is a variable declared as constexpr or a literal.

In view of the foregoing problems, according to the present embodiment, constexpr is added to a source program by the method described below.

Figure 4:
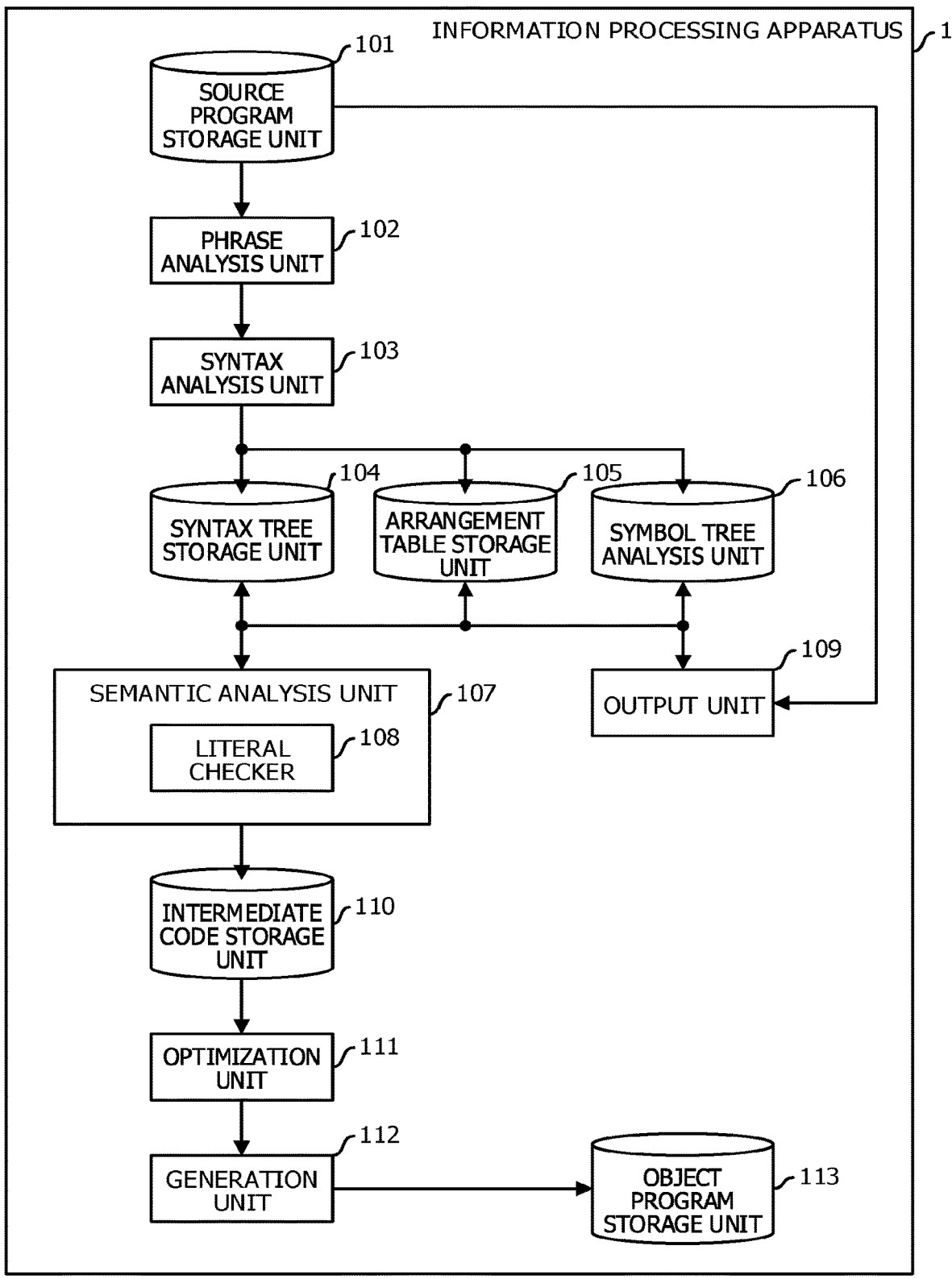
FIG. 4 is a functional block diagram of an information processing apparatus.

FIG. 4 illustrates a functional block diagram of the information processing apparatus 1 according to this embodiment. The information processing apparatus 1 includes a source program storage unit 101, a phrase analysis unit 102, a syntax analysis unit 103, a syntax tree storage unit 104, an arrangement table storage unit 105, a symbol table storage unit 106, a semantic analysis unit 107 including a literal checker 108, an output unit 109, an intermediate code storage unit 110, an optimization unit 111, a generation unit 112, and an object program storage unit 113.

The source program storage unit 101 is configured to store a source program created by the user. The phrase analysis unit 102 is configured to execute, for example, a processing of dividing the source program stored in the source program storage unit 101 into tokens and output the processing result into the syntax analysis unit 103. The syntax analysis unit 103 is configured to execute a processing of generating a syntax tree based on the processing result received from the phrase analysis unit 102 and store syntax tree data of the processing result into the syntax tree storage unit 104. Further, the syntax analysis unit 103 is configured to execute a processing of generating an arrangement table and a symbol table based on the processing result received from the phrase analysis unit 102 and store respectively the arrangement table into the arrangement table storage unit 105 and the symbol table into the symbol table storage unit 106. The literal checker 108 is configured to execute a processing based on data stored in the syntax tree storage unit 104 and update the arrangement table stored in the arrangement table storage unit 105 and the symbol table stored in the symbol table storage unit 106 based on the processing result. The output unit 109 is configured to modify the source program based on data of the syntax tree stored in the syntax tree storage unit 104 and the symbol table stored in the symbol table storage unit 106 and cause a display device (for example, a display) to display the modified source program. The semantic analysis unit 107 is configured to execute a processing of determining based on data of the syntax tree stored in the syntax tree storage unit 104 whether there is a compile error, and generate an intermediate language code (that is, intermediate code) and store the intermediate language code into the intermediate code storage unit 110. The optimization unit 111 is configured to execute compiler optimization of the intermediate code stored in the intermediate code storage unit 110 and output the code of the execution result to the generation unit 112. The generation unit 112 is configured to generate an object program from a code received from the optimization unit 111 and store the object program into the object program storage unit 113.

According to this embodiment, the phrase analysis unit 102, the syntax analysis unit 103, and the semantic analysis unit 107 correspond to the front end; the optimization unit 111 corresponds to the middle end; and the generation unit 112 corresponds to the back end. Note that detailed descriptions of the semantic analysis unit 107, the intermediate code storage unit 110, the optimization unit 111, the generation unit 112 and the object program storage unit 113 are omitted since those components do not have relation with major components of this embodiment.

Figure 5:
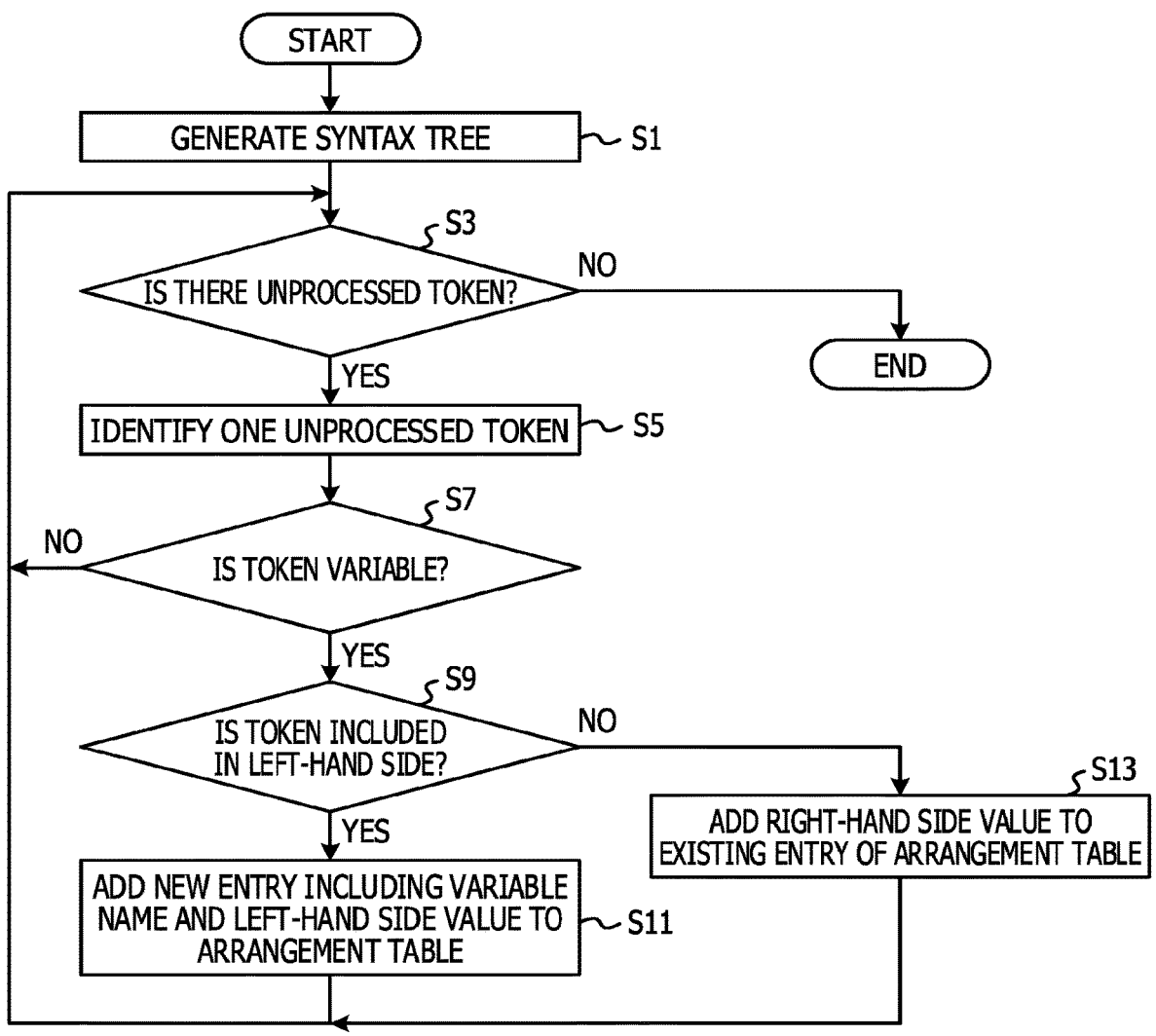
FIG. 5 illustrates a processing flow of a processing of generating an arrangement table.

Next, processings executed by the information processing apparatus 1 is described with reference to FIGS. 5 to 18. FIG. 5 illustrates a processing flow of the processing of generating the arrangement table. FIG. 6 illustrates an example of the source program. When the processing starts, data of the syntax trees stored in the syntax tree storage unit 104, the arrangement tables stored in the arrangement table storage unit 105 and the symbol tables stored in the symbol table storage unit 106 are initialized.

First, assume that a source program is stored into the source program storage unit 101 of the information processing apparatus 1. In this embodiment, assume that the source program illustrated in FIG. 6 is stored in the source program storage unit 101. The phrase analysis unit 102 executes a processing of dividing the source program stored in the source program storage unit 101 into tokens and outputs the processing result into the syntax analysis unit 103.

Figure 7:
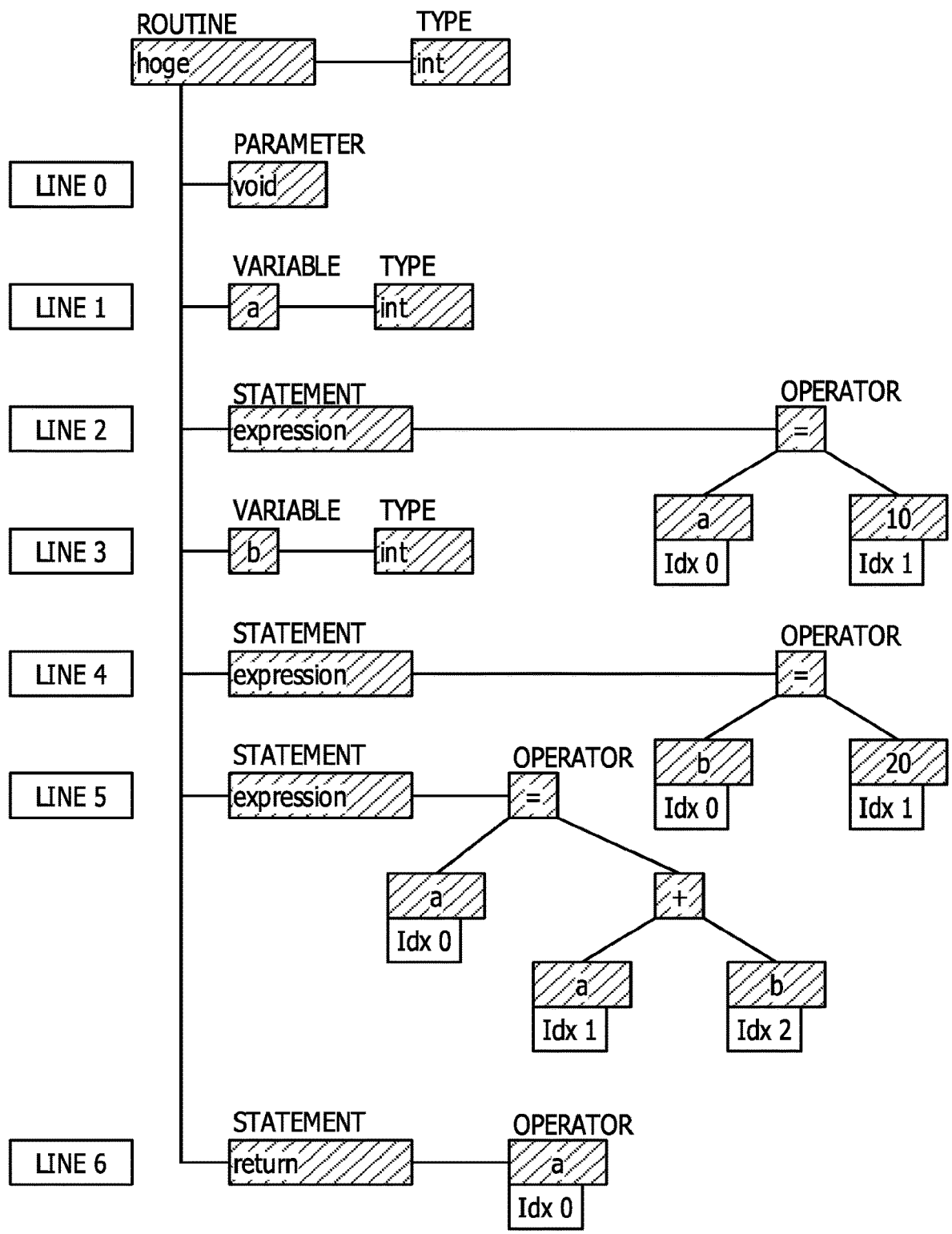
FIG. 7 illustrates an example of a syntax tree.

The syntax analysis unit 103 generates a syntax tree based on the processing result received from the phrase analysis unit 102 (FIG. 5: step S1) and stores the generated syntax tree data into the syntax tree storage unit 104. FIG. 7 illustrates an example of the syntax tree. In the example of FIG. 7, the tokens are shaded. Detailed description of the processing of generating the syntax tree is omitted here as it is a known technique.

The syntax analysis unit 103 determines whether the generated syntax tree includes an unprocessed token (step S3). When there is an unprocessed token (step S3: Yes), the syntax analysis unit 103 identifies the one unprocessed token (step S5).

The syntax analysis unit 103 determines whether the token identified in the step S5 is a variable (step S7). According to this embodiment, the token indicated as "Variable" in the syntax tree is a variable. In the example of FIG. 7, a and b are variables. When the token is not a variable (step S7: No), the process returns to the processing of the step S3 for processing a next token.

Meanwhile, when the token is a variable (step S7: Yes), the syntax analysis unit 103 determines whether the token is included in the left-hand side of the expression (step S9). In the example of FIG. 7, a token of "Idx 0" in "Line2", "Idx 0" in "Line4" or "Idx 0" in "Line5" is determined to be included in the left-hand side of the expression.

When the token is included in the left-hand side of the expression (step S9: Yes), the syntax analysis unit 103 adds a new entry including the variable name and the left-hand side value to the arrangement table stored in the arrangement table storage unit 105 (step S11). Then, the process returns to the processing of the step S3. According to this embodiment, the left-hand side value is expressed in the format of (x), and the right-hand side value is expressed in the format of (x, y). x is a line number, and y is an index number.

When the token is not included in the left-hand side of the expression (step S9: No), the syntax analysis unit 103 adds the right-hand side value to an existing entry in the arrangement table stored in the arrangement table storage unit 105 (step S13). Then, the process returns to the processing of the step S3.

FIG. 8 illustrates an example of the arrangement table stored into the arrangement table storage unit 105. In the example of FIG. 8, a variable name, a left-hand side value and a right-hand side value are stored.

Meanwhile, when there is no token (step S3: No), the syntax analysis unit 103 generates the symbol table for the source program and stores the symbol table into the symbol table storage unit 106, and the process ends.

Figure 9:
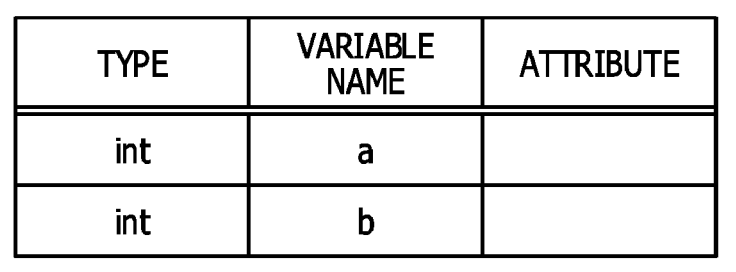

FIG. 9 illustrates an example of the symbol table. In the example of FIG. 9, a variable type, a variable name, and an attribute are stored. At the timing of this processing, data is not stored in the attribute field.

Figure 10:
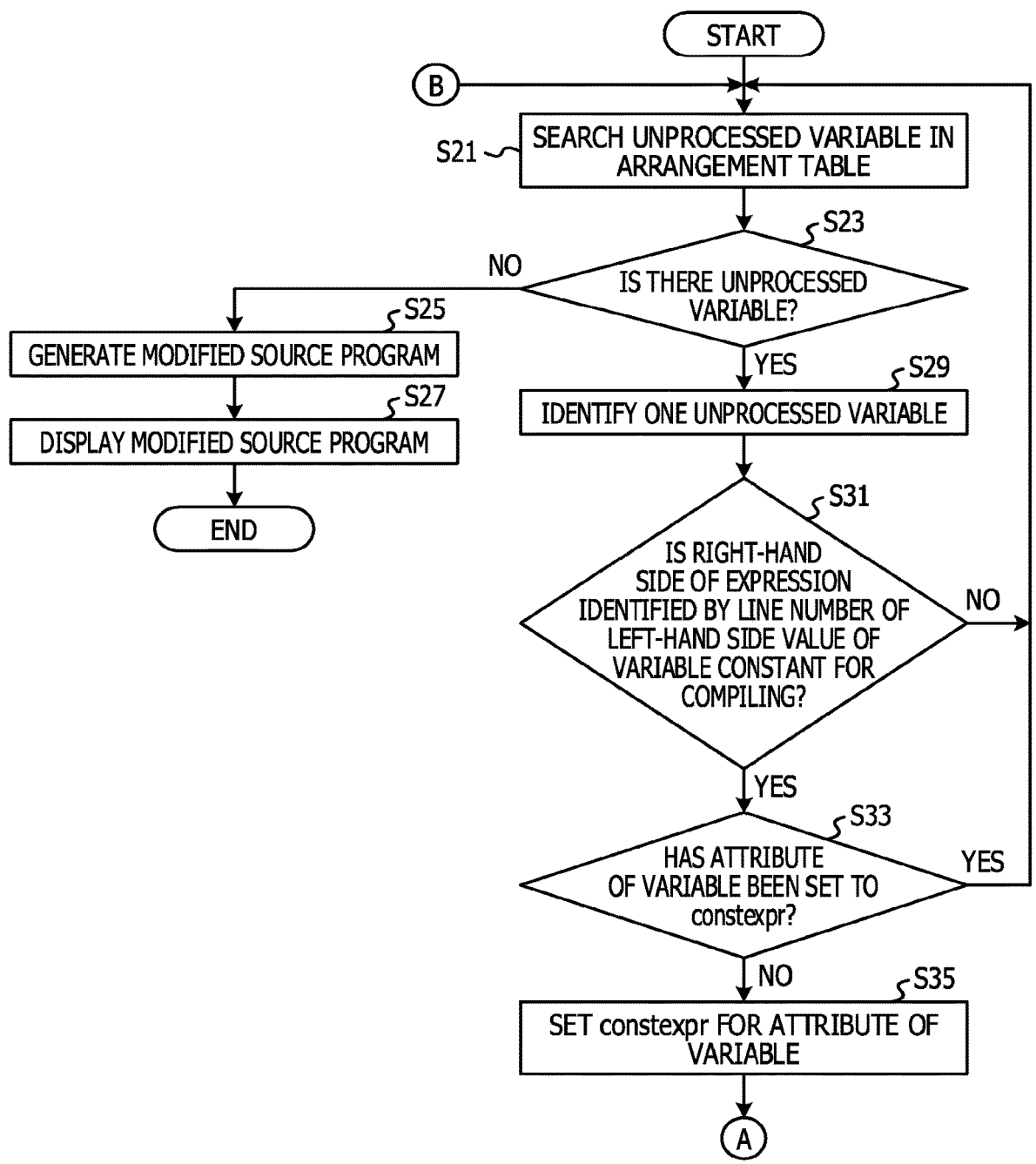
FIG. 10 illustrates a main processing flow.
Figure 12:
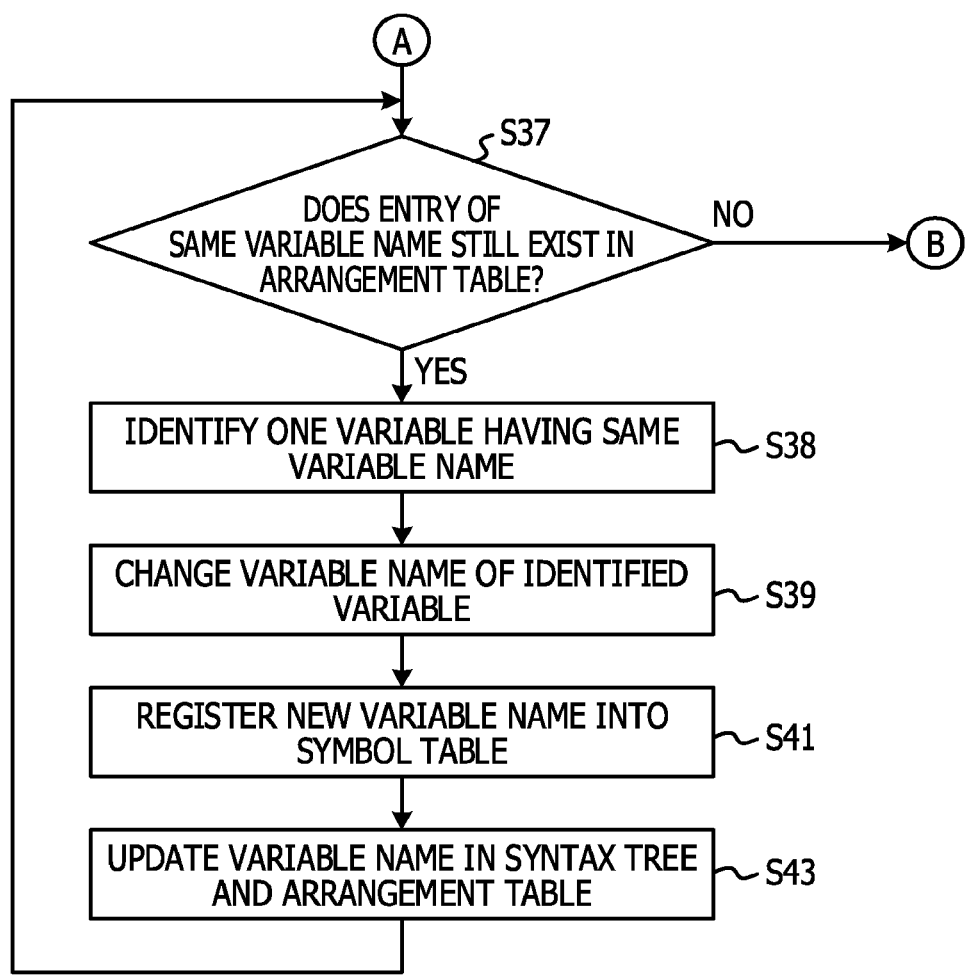
FIG. 12 illustrates another main processing flow.

Next, a processing executed by the literal checker 108 is described. FIGS. 10 and 12 illustrate a main processing flow. After generation of the arrangement table and the symbol table has completed, the literal checker 108 searches an unprocessed variable in the arrangement table stored in the arrangement table storage unit 105 (FIG. 10: step S21).

The literal checker 108 determines whether there is an unprocessed variable in the arrangement table storage unit 105 (step S23). When there is an unprocessed variable (step S23: Yes), the literal checker 108 identifies the one unprocessed variable from the arrangement table (step S29).

The literal checker 108 determines whether the right-hand side of the expression identified by the line number of the left-hand side value of the variable identified in the step S29 is the constant for compiling (step S31). In this embodiment, the right-hand side value is determined as the constant for compiling if it is a constant such as, for example, "10" or "20". Even if the right-hand side includes a variable, if the attribute of the variable is constexpr, the right-hand side is determined as the constant for compiling. That is, in the step S31, the literal checker 108 determines whether the right-hand side of the expression is a literal.

When the right-hand side is not the constant for compiling (step S31: No), the process returns to the processing of the step S21. Meanwhile, when the right-hand side is the constant for compiling (step S31: Yes), the literal checker 108 determines whether the attribute of the variable has been set "constexpr" in the symbol table (step S33).

When the attribute of the variable has been set "constexpr" in the symbol table (step S33: Yes), the process returns to the processing of the step S21. Meanwhile, when the attribute of the variable is not set for "constexpr" in the symbol table (step S33: No), the literal checker 108 sets the attribute of the variable identified in the step S29 for "constexpr" (step S35). The process shifts to the processing of the step S37 of FIG. 12 via a terminal A.

FIG. 11 illustrates an example of the symbol table of data stored thereto after the processing of the step S35. In the example of FIG. 11, the attribute of the variable a is set for "constexpr".

Moving to a description of FIG. 12, the literal checker 108 determines whether an entry of the variable name which is identical with the variable name of the variable identified in the step S29 still exists in the arrangement table (FIG. 12: step S37). When the entry of the same variable name does not exist (step S37: No), the process returns to the processing of the step S21 via a terminal B.

Meanwhile, when the entry of the same variable name still exists in the arrangement table (step S37: Yes), the literal checker 108 identifies one variable having the same variable name (step S38). Then, the literal checker 108 changes the variable name of the variable identified in the step S38 (step S39). In the step S39, for example, a new variable name of the static single assignment form (SSA form) is assigned.

The literal checker 108 registers the new variable name into the symbol table (step S41). FIG. 13 illustrates examples of the symbol table and data stored thereto after the processing of the step S41. In the example of FIG. 13, a new variable name "a2" is newly registered in the symbol table.

For the variable whose variable name having been changed to the new variable name, the literal checker 108 updates the variable name in the syntax tree and the variable name in the arrangement table to the new variable name (step S43). Then, the process returns to the processing of the step S37.

Figure 14:
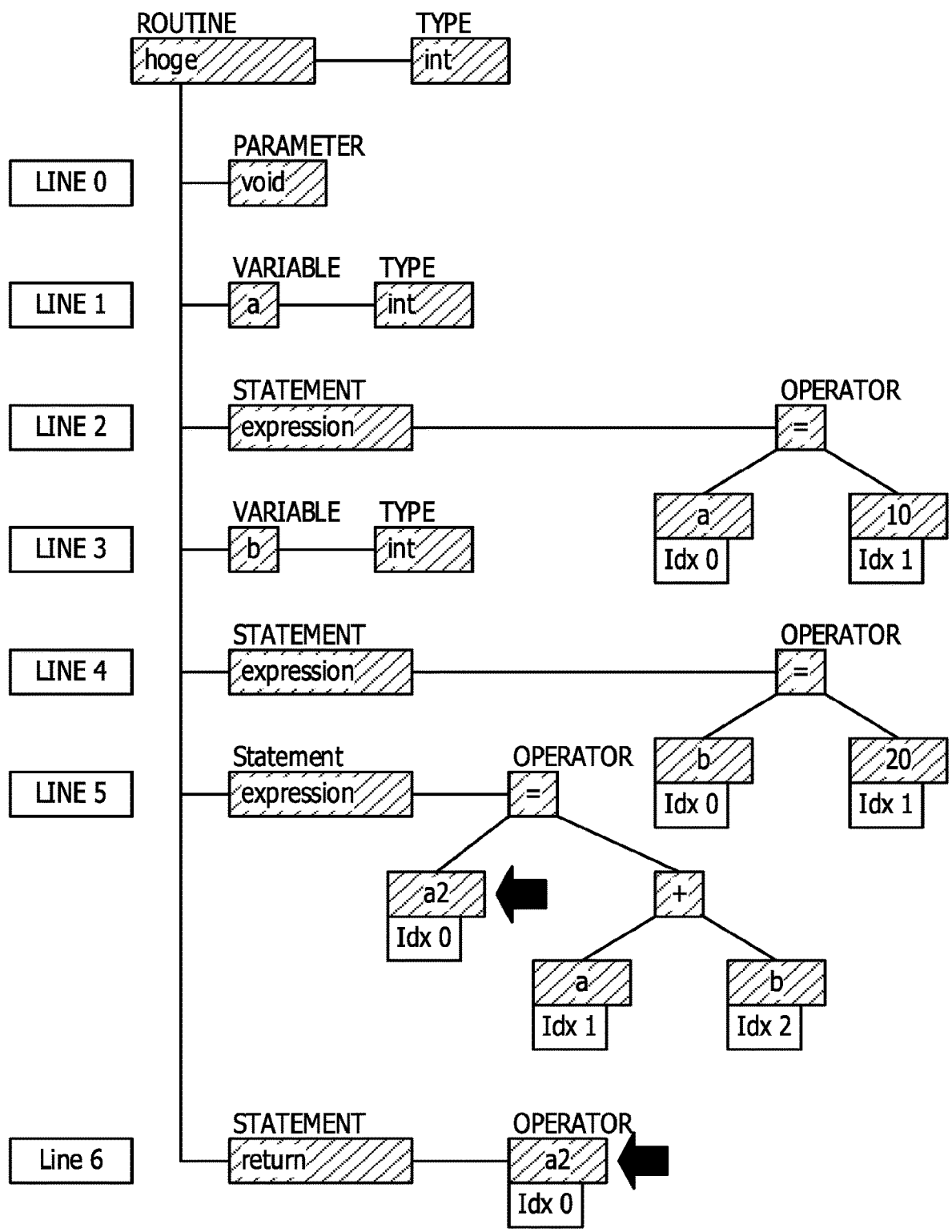
FIG. 14 illustrates an example of a modified syntax tree.

FIG. 14 illustrates an example of the modified syntax tree after the processing of the step S43. In the example of FIG. 14, the variable name of the token "Idx 0" in "Line5" and the variable name of the token "Idx 0" in "Line6" indicated by black arrows are changed from "a" to "a2".

FIG. 15 illustrates an example of the arrangement table after the processing of the step S43. In the example of FIG. 15, the variable name in the third entry is changed from "a" to "a2".

Referring back to the description of FIG. 10, when there is no unprocessed variable (step S23: No), the literal checker 108 notifies the output unit 109 of that the analysis has completed. In response to the notification, the output unit 109 generates a modified source program based on data of the syntax tree stored in the syntax tree storage unit 104 and the symbol table stored in the symbol table storage unit 106 (step S25).

FIG. 16 illustrates examples of the symbol table and data which is stored thereto in the processing of the step S25. In the example of FIG. 16, the attribute "constexpr" is set for all of variables a, b, and a2. In such a state, the output unit 109 modifies the source program, for example, as illustrated in FIG. 17. That is, the output unit 109 adds the specifier "constexpr" to the declaration of a variable for which the attribute "constexpr" is set in the symbol table. In this case, as for the variable a2, the code "a+=b;" is rewritten to a code "a2=a+b" based on data of the syntax tree.

The output unit 109 causes a display unit to display the modified source program (step S27). Then, the process ends. Thus, the user may confirm the content of the modified source code and use as a reference for future development of a program.

Thus, the constant calculation is executed in compiling but not in executing, and thereby the execution time may be reduced. A conventional optimization unit 111, which executes an optimization for the intermediate code, is unable to recognize a whole picture of the source code and therefore unable to determine the effective range of the variable and so on. Thus, an unexecutable optimization may occur. According to this embodiment, however, the optimization is executed in the front end as well. Thus, an optimization in a wide range is possible as compared with the optimization only executed by the optimization unit 111.

Since constexpr is automatically added to the source code, an optimization of a source level is possible even when the user lacks knowledge or a skill.

Also, when the arrangement table such as described above is used, high-speed substitution is possible by substituting only a token affected by change of the variable name out of tokens within the syntax tree.

Since there is a high possibility that an existing constexpr function or an argument passed to the class becomes the constant for compiling, application range of constexpr may be extended. Consequently, the execution time may be further reduced.

The optimization is executed in the optimization unit 111 after a calculable portion has been calculated in the front end. Thus, the processing executed by the optimization unit 111 may be reduced.

Constexpr is added so as to comply with the language standard. Thus, the modified source code may be compiled by another compiler. The method according to the present embodiment does not depend on the architecture.

Difference of the method according to the present embodiment (hereinafter referred to as the present method) from other methods is described with reference to FIG. 18. In this case, these methods are compared from four points of view including the processor dependence, the compilation time, the execution time, and the convenience.

The present method and a method of manually adding constexpr may be applied to a compiler which supports C++11. Meanwhile, the constant propagation (that is, an optimization performed by middle end or back end) desires build-up of the optimization unit 111 of the compiler. Therefore, a function of the optimization unit 111 is not available to other compilers. That is, the constant propagation is processor-dependent.

The present method and a method of manually adding constexpr execute the constant calculations in one time and thereby reduce the compilation time. Meanwhile, the method of using the constant propagation takes a longer compilation time than the present method, since the constant propagation is performed every time an optimization function is applied in the optimization unit 111.

The present method mechanically adds constexpr without omission. Thus, compared with the method of manually adding constexpr, execution performance is improved and execution time is reduced.

In the present method, the user may use constexpr without knowledge of how to use constexpr. Thus, convenience may be improved. Since the present method is in compliance with the language standard of C++11, the modified source program may be compiled by another processing system. Meanwhile, when manually adding constexpr, the user has to understand how to use constexpr. Thus, the conventional method is less convenient than the present method.

Although one embodiment of the present disclosure is described above, the present disclosure is not limited thereto. For example, the functional block configuration of the information processing apparatus 1 described above may not be identical with an actual program modular structure.

Also, the data holding configuration described above is just an example, and is not be limited thereto. Further, even in a processing flow, the sequence of processings may be replaced if there is no change in the processing result. Furthermore, processings may be executed in parallel.

A modified source code and an original source code may be displayed side by side. Although the example illustrates that displaying a modified source code on a display device, a paper in which a modified source code is described may be printed, for example, by a printer.

Figure 19:
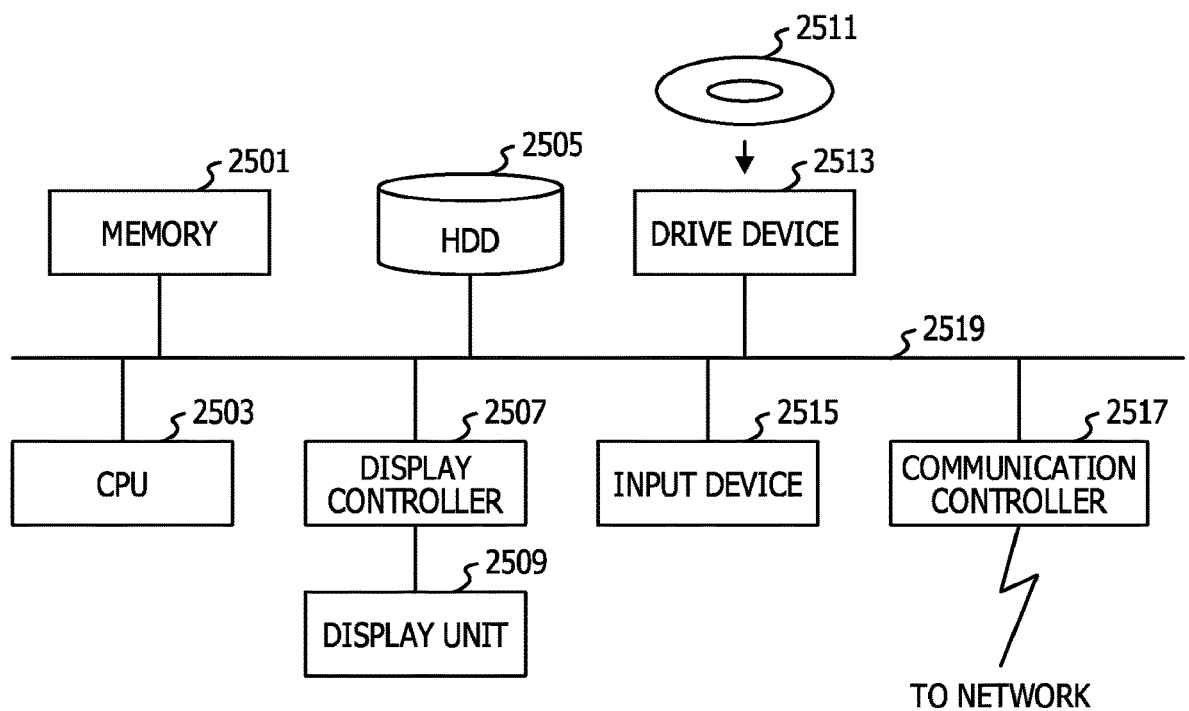
FIG. 19 is a functional block diagram of a computer.

The information processing apparatus described above 1 is a computer apparatus, and as illustrated in FIG. 19, a memory 2501, a central processing unit (CPU) 2503, a hard disk drive (HDD) 2505, a display controller 2507 coupled to a display device 2509, a drive device 2513 for a removable disk 2511, an input device 2515, and a communication controller 2517, which is for coupling to the network, are coupled to each other via the bus 2519. An operating system (OS) and an application program for performing processings according to the embodiment are stored in the HDD 2505, and are read from the HDD 2505 to the memory 2501 when executed by the CPU 2503. The CPU 2503 controls a display controller 2507, a communication controller 2517, and a drive device 2513 to perform a predetermined operation according to a processing content of the application program. Data being processed is predominantly stored in the memory 2501, but may be stored in the HDD 2505. According to the embodiments of the present disclosure, the application program for performing processings described above is distributed by stored in the computer readable removable disk 2511, and installed on the HDD 2505 from the drive device 2513. Also, the application program may be installed on the HDD 2505 via the network or the communication controller 2517 such as the Internet. Such computer devices achieve various functions as described above by organic collaboration among the above-described hardware such as the CPU 2503 and the memory 2501, the OS, and the program such as the application program.

The embodiments of the present disclosure described above are summarized below.

The information processing apparatus according to a first aspect of this embodiment includes (A) out of one or more variables included in the source program, an identification unit configured to identify the variable handleable as a constant in compiling, (B) an addition unit configured to add the specifier, to the source program, the specifier declaring to handle the identified variable as the constant in compiling, and (C) a conversion unit configured to convert the source program to which the specifier is added into the object program.

Thus, calculation which was performed in executing may be performed in compiling and thereby execution time may be reduced.

The identification unit described above may be configured to (a1) for each of the one or more variables included in the source program, identify an expression including the variable in the left-hand side of the expression, and (a2) identify a variable satisfying a condition that the right-hand side of the corresponding identified expression is a constant, out of the one or more variables included in the source program. Thus, a variable which may be handled as a constant when compilation is identified in an appropriate manner.

The information processing apparatus may further include a modification unit configured to (D) if the multiple same variables are included in the left-hand sides of the multiple expressions in the source program, assign a different variable name to each of the same variables, and modify the source program in accordance with the assignment of the variable names. Thus, the information processing apparatus may handle the variable even when the value of the variable is updated.

The information processing apparatus may further include (E) the output unit configured to output the source program to which the specifier is added. Thus, a person such as a source program creator may verify the description method effective for reduction of the execution time.

A compilation method according to a second aspect of this embodiment includes (F) identifying a variable, out of one or more variables included in the source program, which may be handled as a constant in compiling, (G) adding, to the source program, the specifier declaring to handle the identified variable as a constant in compiling, and (H) converting the source program to which the specifier is added into the object program.

A program for causing a computer to perform processings by the above method may be created, and the program may be stored, for example, in a computer readable storage medium or a storage device such as a flexible disk, a CD-ROM, an optical magnetic disk, a semiconductor memory, and a hard disk. Note that intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
identify a first variable out of a plurality of variables included in a source program, the first variable being available as a constant by a compiler;
associate, in the source program, a first specifier with the identified first variable, the first specifier being configured to declare, to the compiler, that any variable associated with the first specifier is to be handled as the constant;
identify a second variable from among a remainder of the plurality of variables, the second variable having a name same as a name of the identified first variable associated with the first specifier;
replace, in the source program, the name of the identified second variable with name different from the name of the identified first variable associated with the first specifier; and
perform a compiling process by the compiler on the replaced source program after the associating and the replacing,
wherein a right-hand side value of one or more expressions is added to an existing entry in an arrangement table when a token is identified, by a syntax tree, as a variable from processing the one or more expressions and when the token is not included in a left-hand side of the one or more expressions.

2. The information processing apparatus according to claim 1, wherein the processor is configured to identify the first variable by:
specifying one or more expressions, including the plurality of variables in a left-hand side of the one or more expressions, and
determining whether each right-hand side of each of the one or more expressions is a constant.

3. The information processing apparatus according to claim 1, wherein the processor is configured to:
identify another variable out of the plurality of variables included in the source program, the another variable being available as the constant in the compiling process, the name of the first variable being identical to a name of the another variable;
determine a different name of the another variable which is different from the name of the first variable; and
add another specifier before the another variable.

4. The information processing apparatus according to claim 3, wherein the different name is static single assignment form.

5. The information processing apparatus according to claim 1, wherein the processor is configured to output the source program to which the first specifier is added.

6. A method performed by an information processing apparatus, the method comprising:
identifying a first variable out of a plurality of variables included in a source program, the first variable being available as a constant by a compiler;
associating, in the source program, a first specifier with the identified first variable, the first specifier being configured to declare, to the compiler, that any variable associated with the first specifier is to be handled as the constant;
identifying a second variable from among a remainder of the plurality of variables, the second variable having a name same as a name of the identified first variable associated with the first specifier;
replacing, in the source program, the same name of the identified second variable with a different name from the name of the identified first variable associated with the first specifier; and
performing a compiling process by the compiler on the replaced source program after the associating and the replacing;
wherein a right-hand side value of one or more expressions is added to an existing entry in an arrangement table when a token is identified, by a syntax tree, as a variable from processing the one or more expressions and when the token is not included in a left-hand side of the one or more expressions.

7. The method according to claim 6, wherein the identifying the first variable includes:
specifying one or more expressions, including the plurality variables in a left-hand side of the one or more expressions, and
determining whether each right-hand side of each of the one or more expressions is a constant.

8. The method according to claim 6, further comprising:
identifying another variable out of the plurality of variables included in the source program, the another variable being available as the constant in the compiling process, the name of the first variable being identical to a name of the another variable;
determining a different name of the another variable which is different from the name of the first variable; and
adding another specifier before the another variable.

9. The method according to claim 6, further comprising:
outputting the source program to which the first specifier is added.

10. A non-transitory storage medium storing a program for causing a computer to execute a process, the process comprising:
identifying a first variable out of a plurality of variables included in a source program, the first variable being available as a constant by a compiler;
associating, in the source program, a first specifier with the identified first variable, the first specifier being configured to declare, to the compiler, that any variable associated with the first specifier is to be handled as the constant;
identifying a second variable from among a remainder of the plurality of variables, the second variable having a name same as a name of the identified first variable associated with the first specifier;

replacing, in the source program, the name of the identified second variable with a name different from the name of the identified first variable associated with the first specifier; and performing a compiling process by the compiler on the replaced source code after the associating and the replacing;

wherein a right-hand side value of one or more expressions is added to an existing entry in an arrangement table when a token is identified, by a syntax tree, as a variable from processing the one or more expressions and when the token is not included in a left-hand side of the one or more expressions.

11. The non-transitory storage medium according to claim 10, wherein the identifying the first variable includes:

specifying one or more expressions, including the plurality of variables in a left-hand side of the one or more expressions, and determining whether each right-hand side of each of the one or more expressions is a constant.

12. The non-transitory storage medium according to claim 10, wherein the compiling process further comprises:

identifying another variable out of the plurality of variables included in the source program, the another variable being available as the constant in the compiling process, the name of the first variable being identical to a name of the another variable;

determining a different name of the another variable which is different from the name of the first variable; and adding another specifier before the another variable.

13. The non-transitory storage medium according to claim 10, wherein the compiling process further comprising:

outputting the source program to which the first specifier is added.

* * * * *